(12) United States Patent
Hung et al.

(10) Patent No.: US 7,256,787 B2
(45) Date of Patent: Aug. 14, 2007

(54) METHOD TO IMITATE LIFELIKE IMAGES FOR COMPUTER DEFORMED OBJECTS

(76) Inventors: Jui-Hsin Hung, No. 35-5, Wenyuan Rd., Peitou Chen, Changhua Hsien (TW); Chieh-Chih Chang, No. 50, Lane 445, Yungmei Rd., Yangmei Chen, Taoyuan Hsien (TW)

( * ) Notice: Subject to any disclaimer, the term of this patent is extended or adjusted under 35 U.S.C. 154(b) by 606 days.

(21) Appl. No.: 10/841,677

(22) Filed: May 7, 2004

(65) Prior Publication Data
US 2005/0083332 A1    Apr. 21, 2005

(30) Foreign Application Priority Data
Oct. 21, 2003    (TW) .............................. 92129079 A

(51) Int. Cl.
*G06T 15/70*    (2006.01)
*G06T 15/00*    (2006.01)
*G06F 17/00*    (2006.01)

(52) U.S. Cl. ..................... 345/473; 345/419; 345/441; 382/103; 382/190; 715/700; 715/764

(58) Field of Classification Search ............... 715/700, 715/764; 345/419, 473, 474, 418, 441; 382/103, 382/118, 190, 203, 282, 286
See application file for complete search history.

(56) References Cited

U.S. PATENT DOCUMENTS

| | | | |
|---|---|---|---|
| 5,818,461 A | 10/1998 | Rouet et al. | |
| 5,995,119 A | 11/1999 | Cosatto et al. | |
| 6,020,892 A | 2/2000 | Dillon | |
| 6,163,322 A | 12/2000 | LaChapelle | |
| 6,476,815 B1 | 11/2002 | Ando | |
| 6,483,513 B1 | 11/2002 | Haratsch et al. | |
| 6,492,986 B1 * | 12/2002 | Metaxas et al. | 345/420 |
| 6,504,942 B1 * | 1/2003 | Hong et al. | 382/103 |
| 6,556,196 B1 | 4/2003 | Blanz et al. | |
| 6,664,956 B1 * | 12/2003 | Erdem | 345/419 |
| 6,807,290 B2 * | 10/2004 | Liu et al. | 382/118 |
| 7,058,209 B2 * | 6/2006 | Chen et al. | 382/117 |
| 2004/0257368 A1 * | 12/2004 | Anderson | 345/473 |

OTHER PUBLICATIONS

Stefan Weber, et al., Experiments in Imitation Using Perceptuo-Motor Primitives, ACM 2000.*

(Continued)

*Primary Examiner*—Tadesse Hailu
(74) *Attorney, Agent, or Firm*—Woodcock Washburn LLP

(57) ABSTRACT

A method to imitate lifelike images for computer deformed objects includes the following steps, selecting a number of significant points on an object, categorizing the significant points into measurable points and specific points, defining a relationship between the measurable points and the specific points with a statistical regression model, creating a table of weighted values for the specific points and animating an object based on the weighted value table. The present invention uses the measured displacement of a number of measurable points to calculate expected positions of the specific points to reduce processing time and create real time images. The method uses a statistical analysis method to decrease access time to a database, save storage space of the database and create lifelike, real-time and animated images in accordance with the object as the object changed its surface.

10 Claims, 7 Drawing Sheets

OTHER PUBLICATIONS

Michael Schroeder and Penny Noy, Multi-Agent Visualization Based on Multivariate Data, ACM May 28-Jun. 1, 2001.*

Ze-Jing Chuang and Chung-Hsien Wu, Parameter-based Lip Modeling for Facial Animation of General Objects, IEEE 2002.*

Rajkiran Gottumukkal and Vijayan K. Asari, System Level Design of Real Time Face Recogition Architecture Based on Composite PCA, ACM Apr. 28-29, 2003.*

* cited by examiner

METHOD TO IMITATE LIFELIKE IMAGES FOR COMPUTER DEFORMED OBJECTS

BACKGROUND OF THE INVENTION

1. Field of the Invention

The present invention relates to a method for creating lifelike images for computer deformed objects, and more particularly to a method to imitate lifelike images, which uses a statistical regression analysis method to create a weighted value table that is used to estimate positions of desired specific points on the deformed object or robotic face.

2. Description of Related Art

Computer deformed objects and animated facial expressions of robots need to be lifelike so that the deformed objects look real. Methods for imitating and creating lifelike images for computer deformed objects in accordance with prior art can be found in U.S. patents by Kelly Dillon, U.S. Pat. No. 6,020,892, Christian Rouet etc, U.S. Pat. No. 5,818,461, Pierre LaChapelle, U.S. Pat. No. 6,163,322, Erich Haratsch, et. al., U.S. Pat. No. 6,483,513 B1, Eric Cosatto, et. al.,. U.S. Pat. No. 5,995,119, Tsutomu Ando, U.S. Pat. No. 6,476,815 B1 and Volker Blanz, et. al., U.S. Pat. No. 6,556,196 B1.

The conventional methods for creating lifelike images in the aforementioned patent documents typically use either interpolation or image composition methods to imitate animated images and can be divided into the following categories.

The first conventional method prepares many images of different shapes or expressions by deforming a physical object before animating an object. The prepared images are stored in a database, and the images will occupy a huge storage space in the database. Therefore, the first method to animate an object requires observation of changes in the shape of a similar physical object and identifying stored images for an image that that are close to a recent image of the physical object as the physical object becomes deformed.

The second conventional method uses interpolation to calculate positions of some desired points on imitated lifelike images to create the animated images of the physical object. The images of the physical object must be observed before and after the physical object changes, and then using an interpolation method, the desired points on the animated images are calculated. Such a method is included in the 3DS MAX software uses a morphing function to embody the animated images.

The third conventional method is similar to the first method, but the third method uses a method of calculating proportional differences between the different representative images to form lifelike composites of the animated images of the deformed objects.

The fourth conventional method determines several measurable points and specific points on the physical object's surface, and then establishes a weighted value table by calculating distance differences between each of the specific points to all the measurable points. When the physical object's appearance or shape has changed, the displacements of all the measurable points are measured, and the positions of the specific points can be found by a relationship related to the displacement of the measured measurable points and the weighted value table. Thereafter, the deformations can be created since the positions of all the measurable points and the specific points are known after the physical object has changed shape. This method is included in the MAYA and 3DS MAX software.

However, the first and the second conventional methods require a huge database to store the pre-processed images and can only imitate an image that was created and stored in the database prior to the animation. If a desired image cannot be found in the database, the desired animated image cannot be created. Furthermore, the time required to search the entire database for a stored image with the two methods makes real-time animation prohibitive.

The third conventional method also requires a huge database to store representative images for image composition. The application of the third conventional method is limited by the quantity of representative images stored in the database. Although, an improvement called Principal Component Analysis (PCA) has been incorporated in the third conventional method to reduce the storage space required in the database for the representative images. However, PCA necessitates a great deal of pre-processing, which takes time.

The fourth conventional method requires a specialist, such as a professional animator, to create the weighted value table based on the physical features of the object, such as muscle distribution of a body. Creating the weighted value table is a huge task and is particularly difficult if the physical features of the object cannot be clearly distinguished or found.

To overcome the shortcomings, the present invention provides a method to imitate living images in real-time for computer deformation of objects in real-time to mitigate or obviate the aforementioned problems.

SUMMARY OF THE INVENTION

The main objective of the present invention is to provide a method to imitate living images in real-time for computer deformation of objects.

Another objective of the present invention is to provide a method to imitate lifelike images that uses a statistical model to reduce calculations in the creation of data for a weighted value table and provide precise data to perform an animation.

The method to imitate lifelike images for computer deformed objects comprises the steps of selecting a number of significant points on an object such as human face, categorizing the significant points into measurable points and specific points, defining a relationship between the measurable points and the specific points with a statistical regression analysis, creating a table of weighted values for the specific points and either animating an object based on the weighted value table.

The method will save a lot of time in pre-processing the object to establish a weighted value table that contains all the weighted values. In addition, the statistical analysis method is a precise analysis method so that the estimated positions of the specific points are very close to the exact positions of the specific points on the real object.

Since the method only demands to store relevant weighted values, storage space for the weighted values in a database is smaller than the storage space required in cited prior art methods. Also, the calculation for the deformation images is not complex such that the simulation can be rapidly performed to create real-time images.

Other objectives, advantages and novel features of the invention will become more apparent from the following detailed description when taken in conjunction with the accompanying drawings.

DETAILED DESCRIPTION OF THE PREFERRED EMBODIMENT

The following detailed description of a method to imitate lifelike images for computer animated objects in accordance with the present invention specifically describes the method to imitate lifelike images for a computer animated face. The method can be used to imitate lifelike images for control of robotic facial expressions, which is the same and is not further described.

Figure 1:
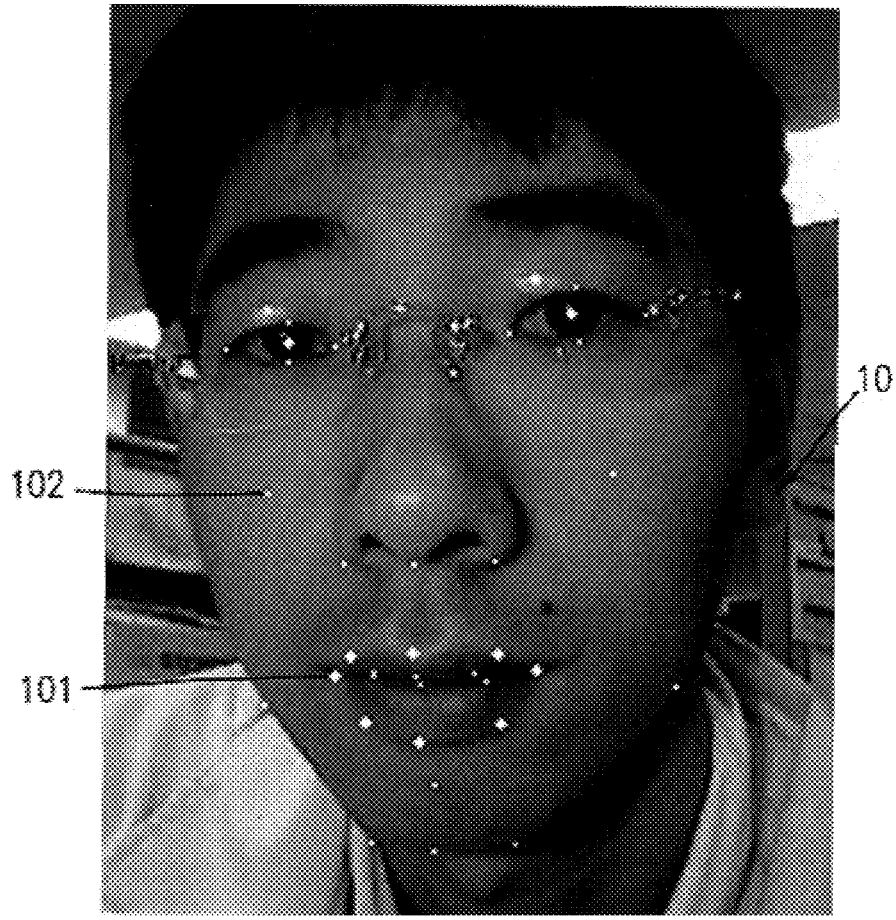
FIG. 1 is a photograph of a person's face with multiple significant points marked in accordance with the present invention.
Figure 7:
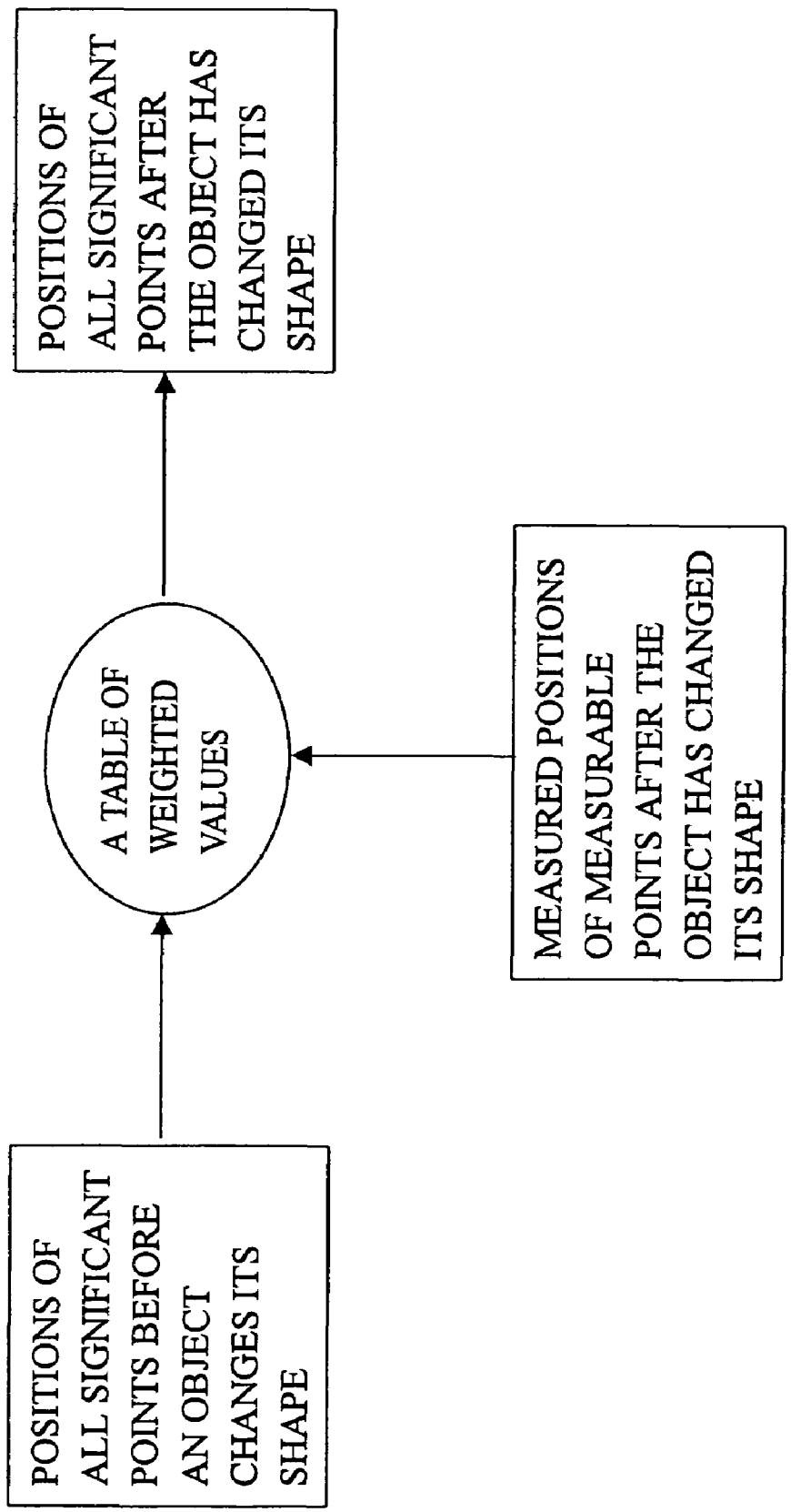
FIG. 7 is a flowchart of the method in accordance with the present invention.

With reference to FIGS. 1 and 7, the method in accordance with the present invention provides a solution to simulate and find predicted positions of multiple specific points (102) on a surface of an object, such as a face (10) after the object changed its shape. The positions of the specific points (102) are related to the simulation of the changed shape of the face (10) and are predicted by measuring and analyzing positions of multiple measurable points (101) on the face (10). If the estimated positions of those significant points including the measurable and the specific points (101, 102) are very close to the real positions on the changed shape of the face (10), the simulation for the facial images will become living and lifelike. The method in accordance with the present invention uses a statistic analysis method of a regression relationship, such as first-order or multi-order multiple linear regression models to deal with the positional relationships of the significant points (101, 102). The positions of the all significant points (101, 102) are described by coordinates that can be either three-dimensional or two-dimensional.

Figure 2:
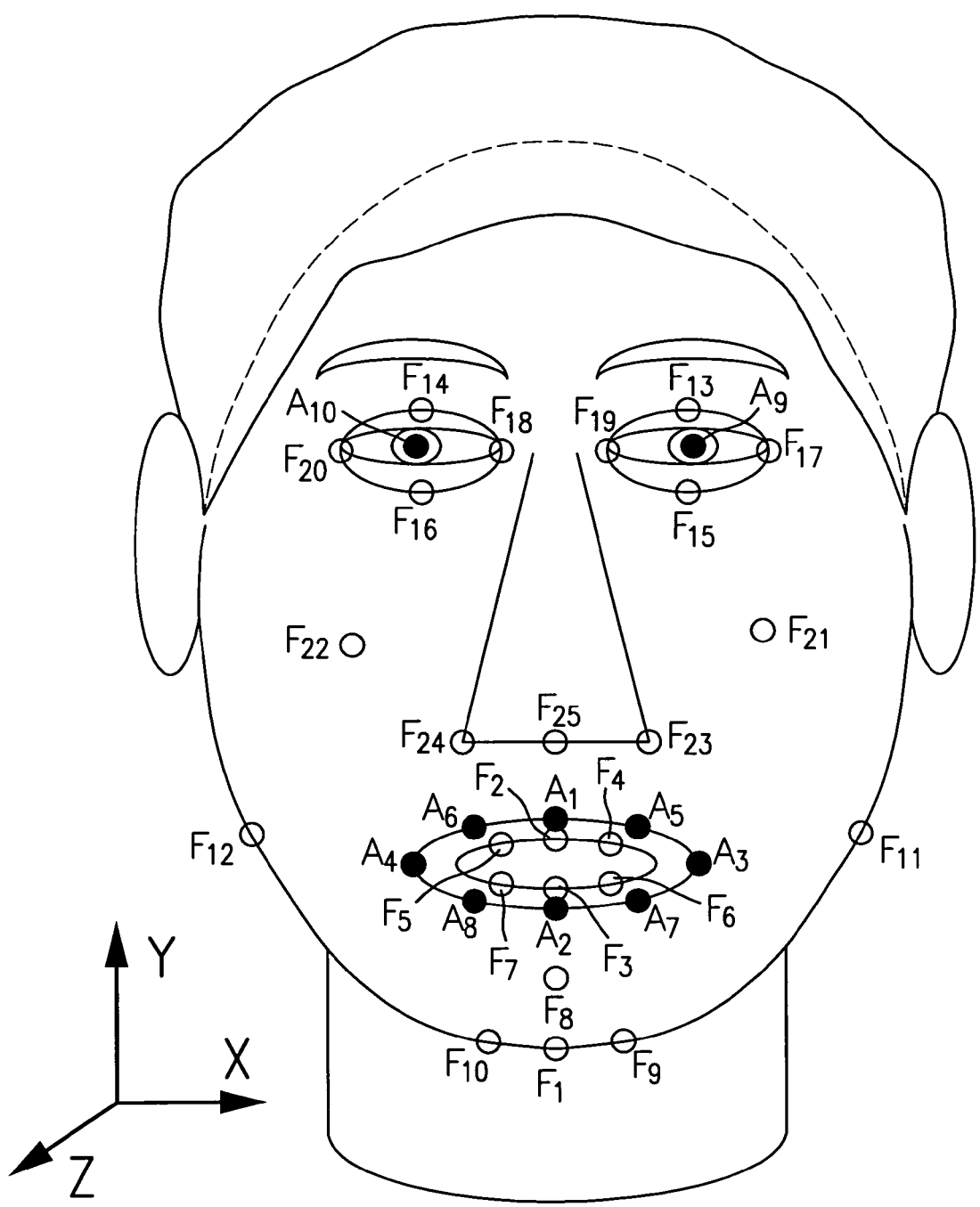
FIG. 2 is a front plan view of animated image with all the significant points in FIG. 1 refer to FAP of MPEG 4 format.

With reference to FIGS. 1 and 2, the step of selecting a number of significant points on a surface of an object may be implemented to select multiple significant points on a face (10) that shows a neutral expression. The selected significant points are selected at positions that change measurably and distinctly as the object changes shape and serve as reference points to reflect changes in the shape of an object.

The step of categorizing the significant points comprises selecting a number of measurable points (101) and a number of specific points (102). The measurable points (101) are at positions that allow their displacements to be definitively observed and measured easily before and after the face (10) changes its expression. For example, the measurable points (101) are located respectively alongside the outer edge of the mouth on the face (10) and at the centers of the eyeballs, because the changes of those positions can be clearly observed before and after the face (10) changes its expression. The measurable points (101) are marked respectively with white crosses and are indicated individually with reference numbers $A_1$ to $A_{10}$. For subsequent calculations, K is the number of measurable points (101).

Likewise, the specific points (102) are at positions that can be measured when the face is neutral but need to be determined after the face (10) changes its expression so the features can be rendered appropriately. In the example, the specific points (102) are located respectively alongside the edge of the face (10), on the cheeks and edges of the nose. The simulated images can be precisely rendered with respect to the real face (10) if the measured and estimated positions of all the measurable points (101) and the specific points (102) are known. The specific points (102) are marked with white dots in FIG. 1 and are indicated individually with reference numbers $F_1$ to $F_{25}$ in FIG. 2. For subsequent calculations, L is the number of specific points (102).

The step of defining a relationship between the measurable points (101) and the specific points (102) with a statistical regression model comprises the steps of changing the shape of the face (10) to create a series of base expressions, measuring the displacements of the measurable points (101) and the specific points (102) for each base expression and using a statistical regression model to define a relationship between the measurable points (101) and the specific points (102).

Figure 3:
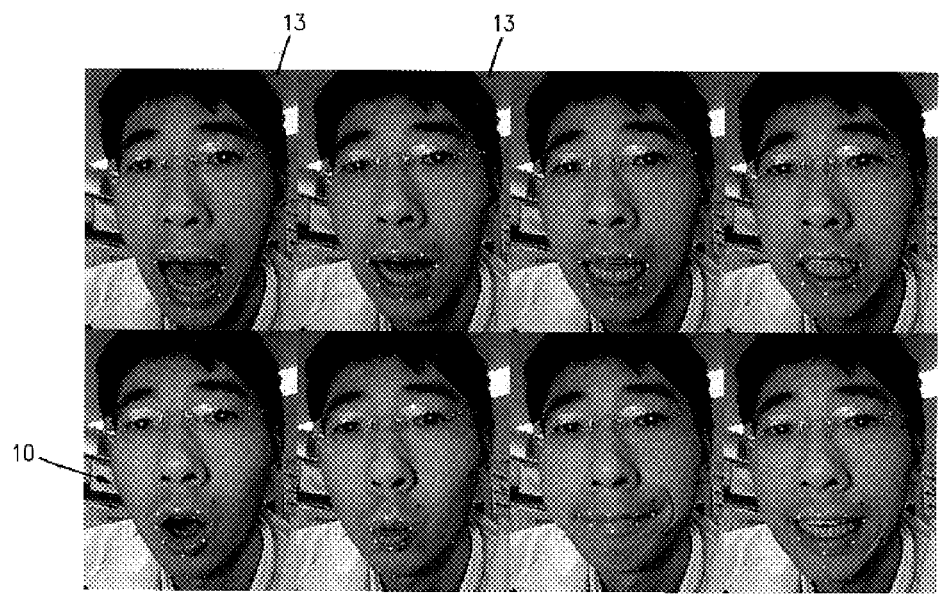
FIG. 3 is a series of base expressions in accordance with the present invention used to create a weighted value table.

With reference to FIG. 3, the shape of the face (10) is changed to create a series of base expressions (13), and m is the number of base expressions (13), where m≧(K+1). The number of the base expressions (13) is greater than the number of the measurable points (101) means that if the more base expressions (13) are selected, the computer images will be more lifelike. Only a small number of the base expressions (13) are shown in FIG. 3.

Measuring the displacements of all the significant points (101, 102) for each base expression comprises measuring the displacement of each significant point (101, 102) from its initial position in the neutral expression to its position in each one of the base expressions (13). Therefore, the displacements of the all significant points (101, 102) is known for each of the base expressions (13).

Defining a relationship between the measured displacements of the measurable points (101) and the specific points (102) is established with a statistical regression model based on the measured displacements of the significant points (101, 102).

The statistical regression model may be a first-order or multi-order multiple linear regression model.

For example, a first-order multiple linear regression model has been established as:

$$F_i = \sum_{n=1}^{K} A_n W_{ni} + C_i$$

(Statistic Multiple Regression Model)

where $F_i$ is denoted as the displacement of the ith specific point (102), $A_n$ is denoted as the displacement of the nth measurable point (101), $W_{ni}$ is denoted as a weighted value corresponding to the ith specific point (102) and the nth measurable point (101), and $C_i$ is a constant value.

The displacements of the nth measurable point (101) for each of the base expressions (13) are respectively denotes as $a_{1n}, a_{2n}, \ldots, a_{mn}$. Likewise, the displacements of the ith specific point (101) for each of the base expressions (13) are respectively denoted as $f_{1i}, f_{2i}, \ldots, f_{mi}$.

Consequently, the first-order multiple linear regression model can be rewrite in matrix form as follow:

$$F_i = \begin{bmatrix} f_{1i} \\ f_{2i} \\ \vdots \\ f_{mi} \end{bmatrix} = AW_i = \begin{bmatrix} a_{11} & \cdots & a_{1K} & 1 \\ a_{21} & \ddots & a_{2K} & 1 \\ \vdots & \vdots & \ddots & \vdots \\ a_{m1} & \cdots & a_{mK} & 1 \end{bmatrix} \begin{bmatrix} w_{1i} \\ \vdots \\ w_{Ki} \\ c_i \end{bmatrix}$$

The step of creating a table of weighted values for the specific points (102) is implemented to solve the aforesaid matrix form with a statistical solution of least square approximation (LSA) to calculate the variable elements of the weighted value matrices $W_{1i}$ to $W_{Ki}$ denoted as a combined weighted value matrix $W_i^*$. The combined weighted value matrix $W_i^*$ can be calculated with matrix calculation as follows:

$A^T F_i = A^T A W_i$, where $A^T$ is a transpose of matrix A, $W_i^* = (A^T A)^{-1} A^T F_i$, where $(A^T A)^{-1}$ is an inverse of matrix $A^T A$.

Therefore, a weighted value table can be established with respect to each of the combined weighted value matrix $W_i^*$, which is listed as follows.

| Calculated Weighted Value Table | | | | | |
| --- | --- | --- | --- | --- | --- |
| | $F_1$ | $\ldots$ | $F_i$ | $\ldots$ | $F_L$ |
| $A_1$ | $W_{11}$ | $\ldots$ | $W_{1i}$ | $\ldots$ | $W_{1L}$ |
| . | . | $\ldots$ | . | $\ldots$ | . |
| . | . | | . | | . |
| $A_n$ | $W_{n1}$ | $\ldots$ | $W_{ni}$ | $\ldots$ | $W_{nL}$ |
| . | . | $\ldots$ | . | $\ldots$ | . |
| . | . | | . | | . |
| $A_K$ | $W_{K1}$ | $\ldots$ | $W_{Ki}$ | $\ldots$ | $W_{KL}$ |
| C | $C_1$ | $\ldots$ | $C_i$ | $\ldots$ | $C_L$ |

The step of either animating an object based on the table of weighted values comprises the following steps: changing the shape of the face (10), measuring the displacement of the measurable positions (101), calculating expected positions of the specific points (102) and using the measured and calculated positions respectively of the measurable points (101) and the specific points (102) to generate an animated object. The weighted values are employed to weight the displacement of the measurable points (102) when calculating the estimated positions of the specific points (102) so as to perform a simulation to create lifelike images about the face (10).

When the weighted value table has been created, the deformation can be performed with the displacements of a number of measurable points (101). Because the variable elements of the displacement matrix A of the measurable points (101) is known after the facial expression is changed, the displacements of each of the specific points (102) can be simulated by a calculation of the aforesaid multiple linear regression model, $$F_i = \sum_{n=1}^{K} A_n W_{ni} + C_i.$$

The animated images of the face (10) can be simulated to create life-like computer animations or to control the facial expressions of a robot when the displacements of all points (101, 102) are known.

Therefore, the animated object can be established by tracking the changes of the number of measurable points (101) as the face (10) changes its shape, calculating simultaneous positions of the specific points (102) with the corresponding weighted values and generating the animated images. Since the positions of only a number of measurable points (101) need to be measured, the images created by the present method will be animated in real time.

Figure 4:
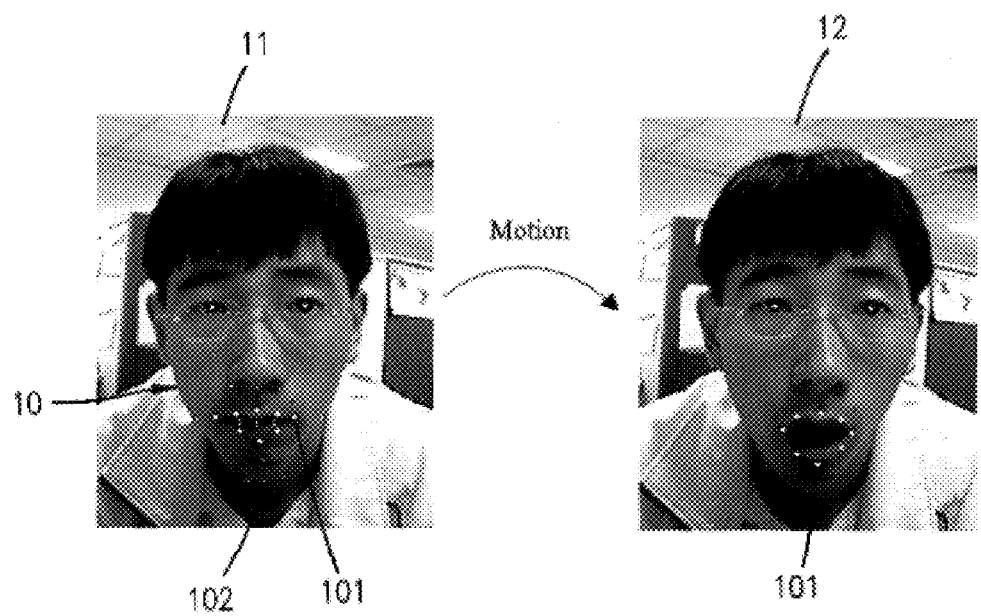
FIG. 4 is a photograph of a person's face with the measurable points in FIG. 1 changing from a neutral expression to a later expression.
Figure 5:
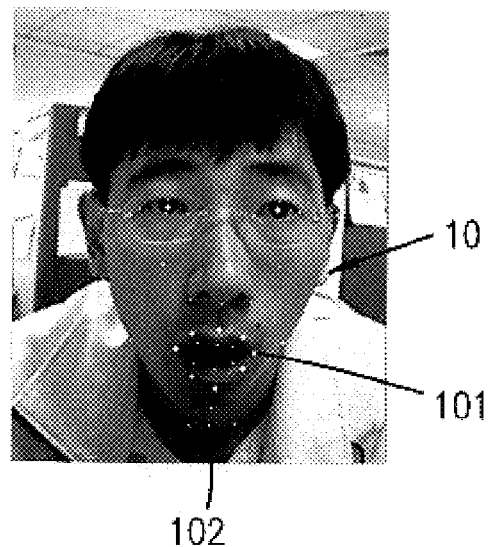
FIG. 5 a photograph of a person's face in FIG. 4 with simulated positions of the specific points.
Figure 6:
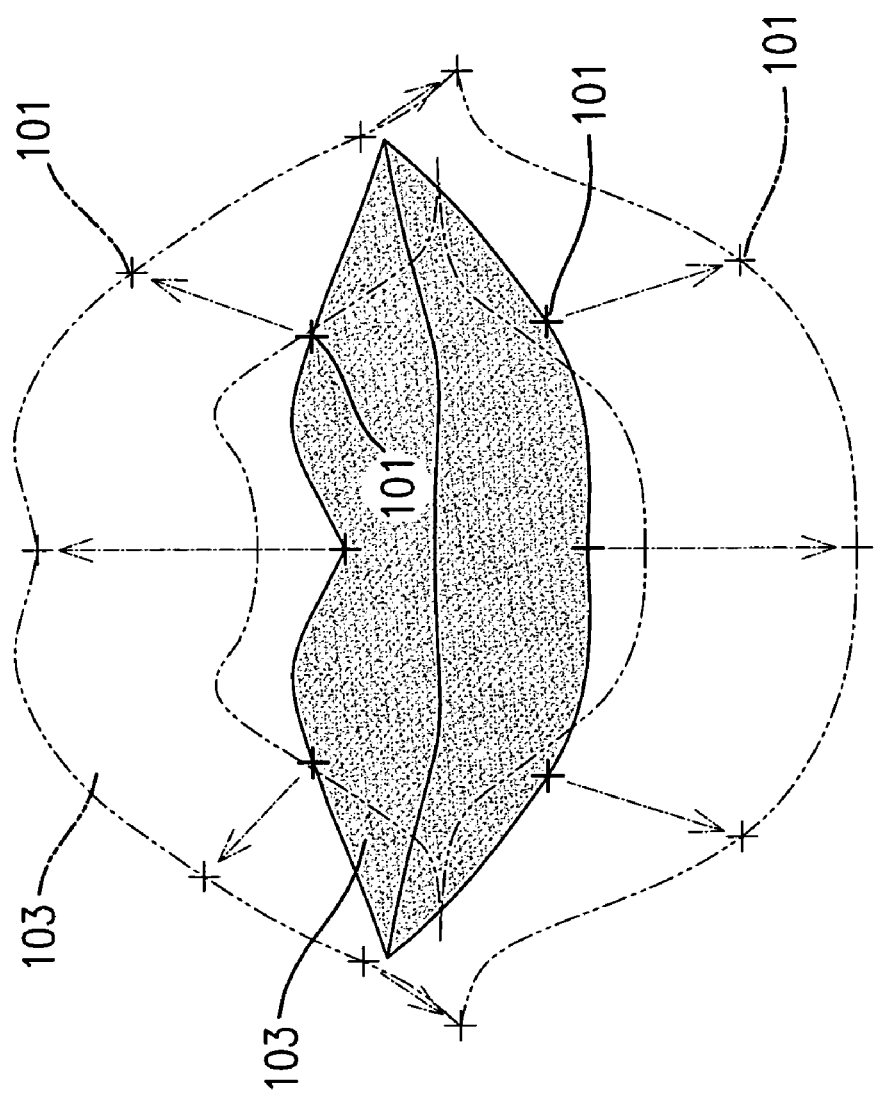
FIG. 6 is an operational front plan view of an animated mouth of the face in FIG. 4 with the displacements of the measurable points when the mouth changes its shape.

With reference to FIGS. 4 to 6, to further describe the step of either animating an object or controlling a robot's facial expressions of the method of the present invention, a further example is provided to explain the effects of the present invention. A neutral expression (11) of the face (10) is observed and shown at the left side of FIG. 4, and the measurable points (101) and desired specific points (102) are determined on the facial surface as previously described after the weighted value table has been created. Then the neutral expression (11) is changed to a later expression (12) shown at the right side of FIG. 4, such as opening the mouth (103) from the rest, which is also schematically illustrated in FIG. 6. The positions of the measurable points (101) and the specific points (102) have been changed from their initial positions. When the displacements of the measurable points (101) are measured, the positions of the specific points (102) can be simulated by the aforesaid multiple linear regression model in cooperation with the created weighted value table to calculate their positions. The simulated positions of the specific points (102) are shown on the face (10) of the later expression (12) with white dots as illustrated in FIG. 5. The simulated positions of the specific points (102) shown in FIG. 5 are almost the exact positions with respect to the real positions of the specific points (102) of the changed neutral expression (11).

Consequently, the present invention can be used to precisely simulate lifelike images of shapes or surfaces of an object by tracking the measurable points (101) as the object changes its shape or surface. Meanwhile, the positions of the specific points (102) can be calculated with the weighted values to create real time and lifelike images. The positions of all significant points (101, 102) can be used to create computer animations or control to present robotic facial expressions with respected to the physical object.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the scope of the appended claims.

What is claimed is:

1. A method to imitate lifelike images for computer deformed objects, and the method comprising:
   (1) selecting a number of significant points on a surface of an object;
   (2) categorizing the significant points into a number of measurable points and a number of specific points;
   (3) defining a relationship between the measurable points and the specific points with a statistic regression analysis by
      a. changing the surface of the object to create a series of base deformations;
      b. measuring displacements of all the measurable points and the specific points for each of the base deformations; and
      c. using the statistic regression analysis to define the relationship by analyzing the measured positions of all the measurable points and the specific points for each base expression;
   (4) creating a table of weighted values for the specific points based on solving the statistic regression analysis; and
   (5) animating a deformed object with following steps:
      a. changing the surface of the object;
      b. measuring displacements of the measurable points;
      c. calculating predict positions of the specific points with the measured displacements of the measurable points and the table of weighted values; and
      d. using measured positions of all the measurable points and the calculated positions of all the specific points to create the deformed object.

2. The method to imitate lifelike images for computer deformed objects as claimed in claim 1, wherein the statistic regression model is a first-order multiple linear regression model, and the first-order multiple linear regression model is solved by a least square approximation to calculate the weighted values.

3. The method to imitate lifelike images for computer deformed objects as claimed in claim 2, wherein the surface of the object is two-dimensional whereby the displacements of all the measurable points and the specific points for each of the base expressions are measured from the changed surface of the object.

4. The method to imitate lifelike images for computer deformed objects as claimed in claim 2, wherein the surface of the object is three-dimensional whereby the displacements of all the measurable points and the specific points for each of the base expressions are measured from the changed surface of the object.

5. The method to imitate lifelike images for computer deformed objects as claimed in claim 1, wherein the statistic regression model is a multi-order multiple linear regression model, and the multi-order multiple linear regression model is solved by a least square approximation to calculate the weighted value.

6. The method to imitate lifelike images for computer deformed objects as claimed in claim 5, wherein the surface of the object is two-dimensional whereby the displacements of all the measurable points and the specific points for each of the base expressions are measured from the changed surface of the object.

7. The method to imitate lifelike images for computer deformed objects as claimed in claim 5, wherein the surface of the object is three-dimensional whereby the displacements of all the measurable points and the specific points for each of the base expressions are measured from the changed surface of the object.

8. The method to imitate lifelike images for computer deformed objects as claimed in claim 1, wherein the surface of the object is two-dimensional whereby the displacements of all the measurable points and the specific points for each of the base expressions are measured from the changed surface of the object.

9. The method to imitate lifelike images for computer deformed objects as claimed in claim 1, wherein the surface of the object is three-dimensional whereby the displacements of all the measurable points and the specific points for each of the base expressions are measured from the changed surface of the object.

10. The method to imitate lifelike images for computer deformed objects as claimed in claim 9, wherein the object is a human face.

* * * * *